(12) United States Patent
Shishido

(10) Patent No.: US 9,297,982 B2
(45) Date of Patent: Mar. 29, 2016

(54) LENS BARREL

(71) Applicant: Olympus Corporation, Shibuya-ku, Tokyo (JP)

(72) Inventor: Hiroyuki Shishido, Hachioji (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 14/608,546

(22) Filed: Jan. 29, 2015

(65) Prior Publication Data
US 2015/0168671 A1 Jun. 18, 2015

Related U.S. Application Data

(63) Continuation of application No. PCT/JP2014/062050, filed on May 1, 2014.

(30) Foreign Application Priority Data

Dec. 13, 2013 (JP) .................................. 2013-258507

(51) Int. Cl.
G02B 15/14 (2006.01)
G02B 7/10 (2006.01)
G03B 3/00 (2006.01)

(52) U.S. Cl.
CPC ... *G02B 7/10* (2013.01); *G03B 3/00* (2013.01)

(58) Field of Classification Search
USPC .................................. 359/694–704, 811–830
See application file for complete search history.

(56) References Cited

U.S. PATENT DOCUMENTS

| | | | |
|---|---|---|---|
| 6,198,578 B1* | 3/2001 | Iwasa et al. | 359/699 |
| 6,373,641 B2* | 4/2002 | Koiwai | 359/700 |
| 6,580,566 B1* | 6/2003 | Kamoda | 359/701 |

FOREIGN PATENT DOCUMENTS

| | | |
|---|---|---|
| JP | 11-174305 | 7/1999 |
| JP | 2002-048966 | 2/2002 |
| JP | 2002-207151 | 7/2002 |
| JP | 2003-279829 | 10/2003 |
| JP | 2009-258295 | 11/2009 |
| JP | 2012-008335 | 1/2012 |

OTHER PUBLICATIONS

International Search Report to International Application No. PCT/JP2014/062050, mailed on Dec. 13, 2013.
Office Action to corresponding Japanese Patent Application Serial No. 2014-521769, mailed Aug. 5, 2014 (3 pgs.), with translation (3 pgs.).

* cited by examiner

*Primary Examiner* — Mohammed Hasan
(74) *Attorney, Agent, or Firm* — John C. Pokotylo; Straub & Pokotylo

(57) ABSTRACT

A lens barrel of the present invention includes a first barrel member on which a first cam groove is formed and which is provided with a first cam follower, and a second barrel member on which a second cam follower to engage with first cam groove is formed, and which is provided with a second cam groove to engage with first cam follower, the second barrel member performing relative rotation and relative movement in an axis direction of the rotation with respect to the first barrel member.

4 Claims, 8 Drawing Sheets

LENS BARREL

CROSS REFERENCE TO RELATED APPLICATION

This application is a continuation application of PCT/JP2014/062050 filed on May 1, 2014 and claims benefit of Japanese Application No. 2013-2.58507 filed in Japan on Dec. 13, 2013, the entire contents of which are incorporated herein by this reference.

BACKGROUND OF THE INVENTION

1. Field of the Invention

The present invention relates to a lens barrel that has a configuration in which cylindrical members are coupled through cam coupling to cause the above cylindrical members to relatively move in an optical axis direction.

2. Description of the Related Art

Lens barrels used in photographing devices such as cameras for shooting photographs have been configured by a plurality of optical lenses or the like, and a plurality of barrel members or the like each holding the plurality of optical lenses and formed in an annular or cylindrical shape. In addition, the plurality of barrel members are configured in such a manner as to be coupled with each other through cam coupling or the like. With such a configuration, the above individual barrel members can relatively move in an optical axis direction to achieve, for example, zooming operation (variable power operation), and focusing operation (focus adjusting operation).

For example, a lens barrel disclosed by Japanese Patent Application Laid-Open Publication No. 11-174305 includes a barrel cam on which a pair of cam grooves are formed and a barrel member provided with pair of cam followers corresponding to the above pair of cam grooves. The lens barrel is configured such that one of the above pair of cam grooves engages with one of the above pair of cam followers, the one cam follower moves in the above one cam groove to cause the above barrel member to move in a first region, the other one of the above pair of cam grooves engages with the other one of the above pair of cam followers, and the other cam follower moves in the above other cam groove to cause the above barrel member to move in a second region.

In addition, cameras or the like (photographing devices) to which this kind of lens barrel applies are those which a user readily carries about and takes out to use at any desired time.

A lens barrel disclosed by Japanese Patent Application Laid-Open Publication No. 2009-258295 or the like includes a first barrel member, on which at least two metal cam pins and at least two resin cam pins are disposed alternately in a circumferential direction on the same circumferential face, and a second barrel member that has cam paths each having the same shape and has a plurality of cam grooves to correspondingly engage with the above metal cam pins and the above resin cam pins, and that can move relatively to the above first barrel member.

In recent years, cameras or the like (photographing devices) to which this kind of lens barrel applies have experienced an increase in zoom magnification (variable power ratio), and for example, photographing devices having an optical zooming function of 10× to 20× magnifications have generally come into practical and widespread use.

SUMMARY OF THE INVENTION

A lens barrel of one aspect of the present invention includes a first barrel member on which a first cam groove is formed and which is provided with a first cam follower, and a second barrel member on which a second cam follower to engage with the first cam groove is formed, and which is provided with a second cam groove to engage with the first cam follower, the second barrel member performing relative rotation and relative movement in an axis direction of the rotation with respect to the first barrel member.

DETAILED DESCRIPTION OF THE PREFERRED EMBODIMENT

Figure 1:
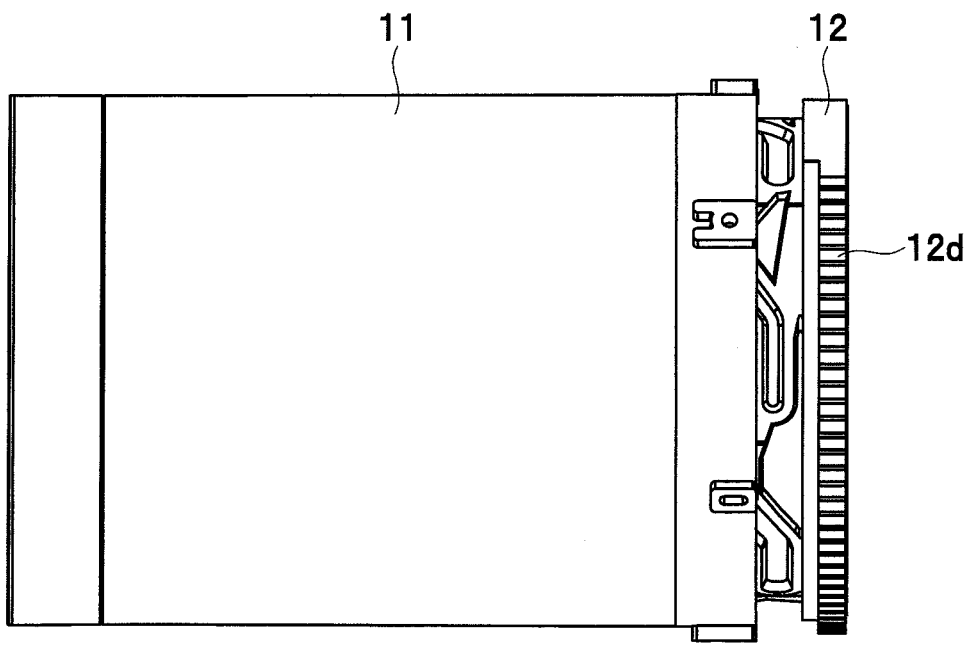
FIG. 1 is a side view showing a pair of barrel members in a lens barrel of one embodiment of the present invention, and showing a retracted state of the pair of barrel members.

The present invention will be described below in conjunction with an embodiment shown in the drawings.

One embodiment of the present invention is an example of the case of applying to a lens barrel enabling variable power operation (zooming) and used in a photographing device such as a camera that is configured to, for example, subject an optical image formed by a plurality of optical lenses to photoelectric conversion using a solid image pickup device, convert an image signal thereby obtained into a digital image data representing a still picture or a movie, and record the digital data created thereby in a recording medium, as well as to playback or display the still picture or the movie on a display device based on the digital image data recorded in the recording medium.

Note that each drawing used in the following description may cause each component to have a different scale so as to make each component have such a size that the component can be recognized in the drawing. The shown embodiment is therefore not intended to limit the present invention with respect to the number of the components, the forms of the components, the size ratios among the components, and the relative positional relationship among the respective components shown in these drawings.

Figure 2:
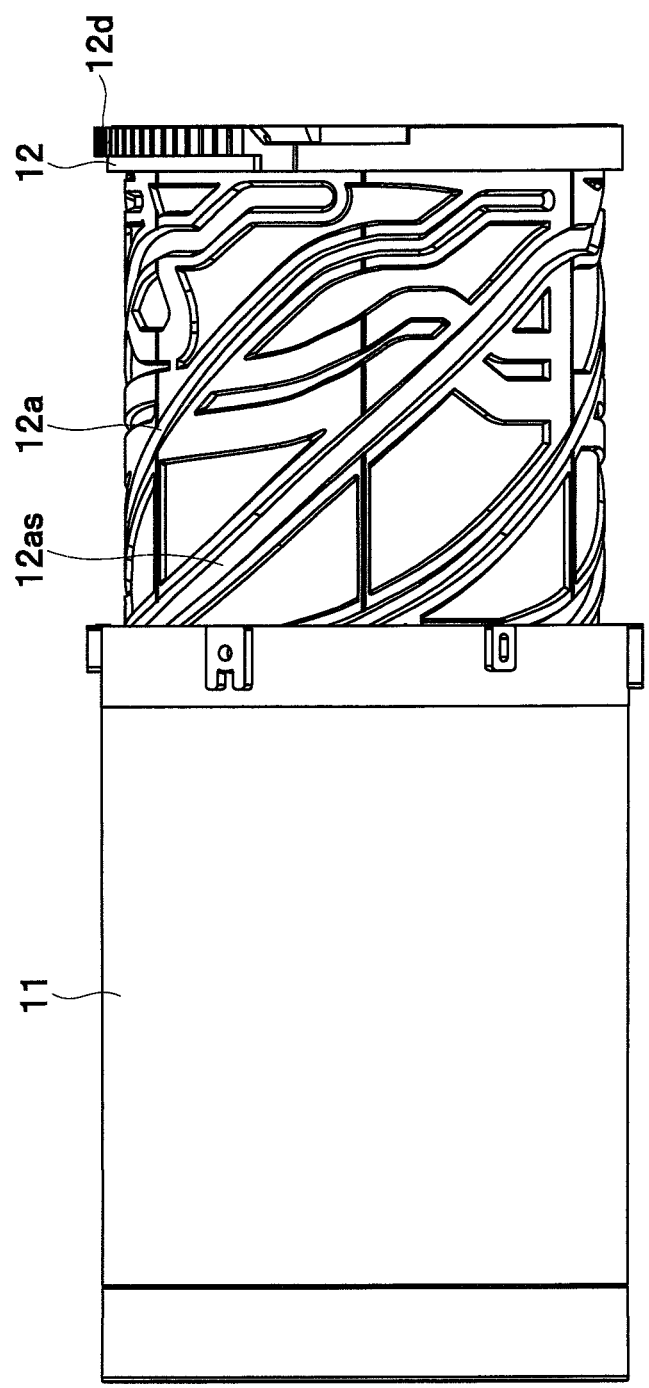
FIG. 2 is a side view showing an extended state of the pair of barrel members shown in FIG. 1.
Figure 3:
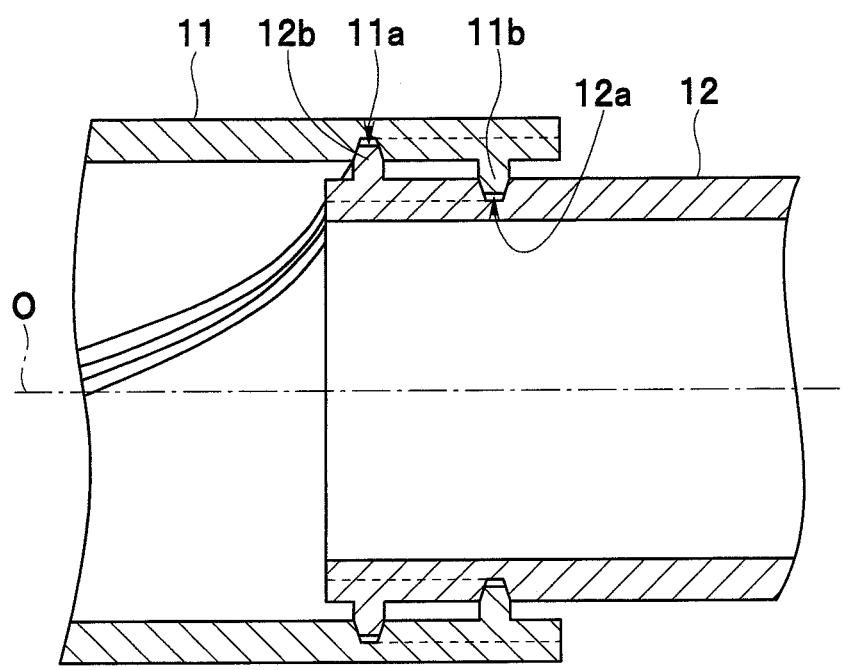
FIG. 3 is a cross sectional view showing a concept about a state where the pair of barrel members shown in FIG. 1 engage.
Figure 4:
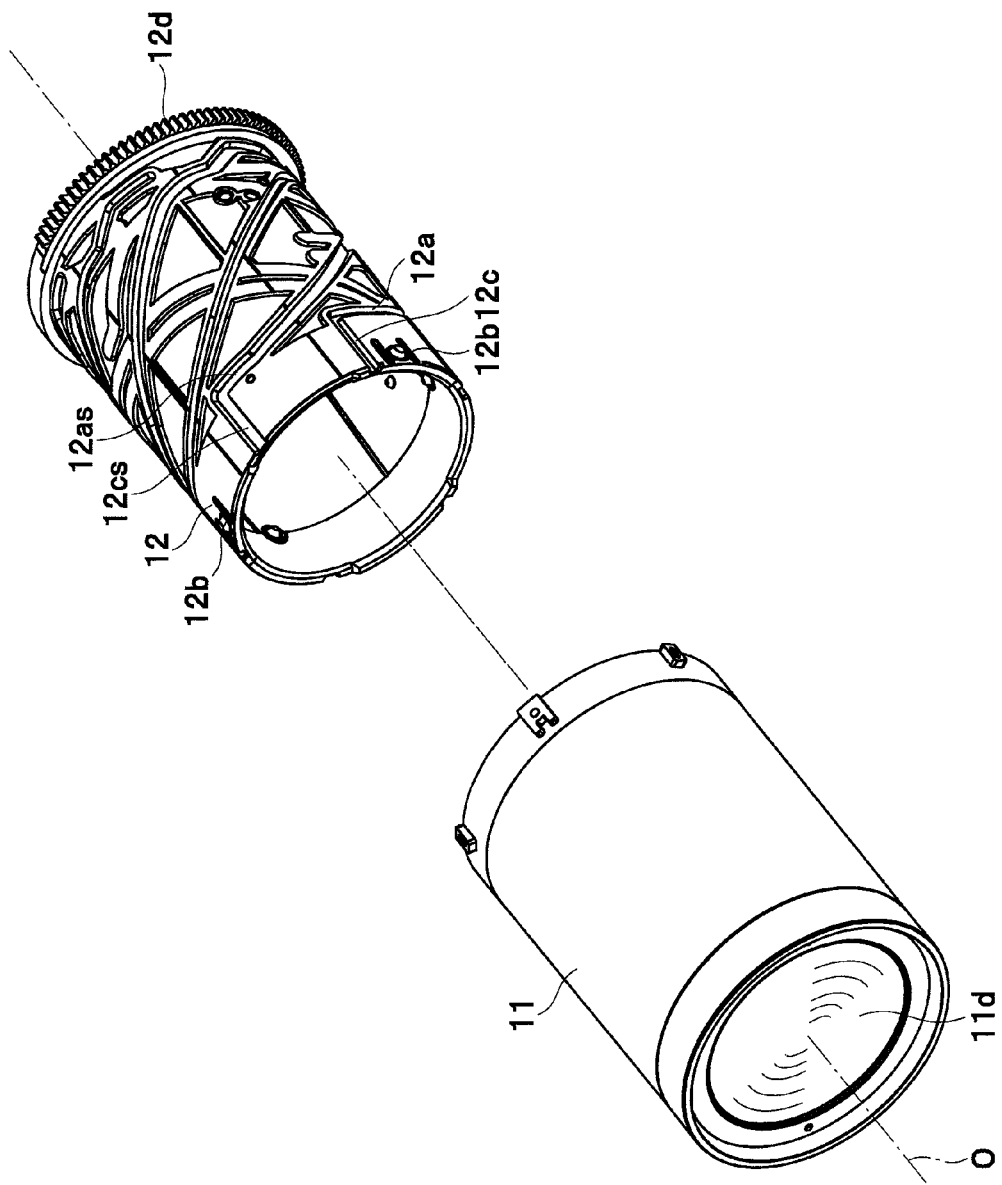
FIG. 4 is a perspective view showing the pair of barrel members shown in FIG. 1 in an exploded manner, and showing mainly the external surface of a cam barrel.
Figure 5:
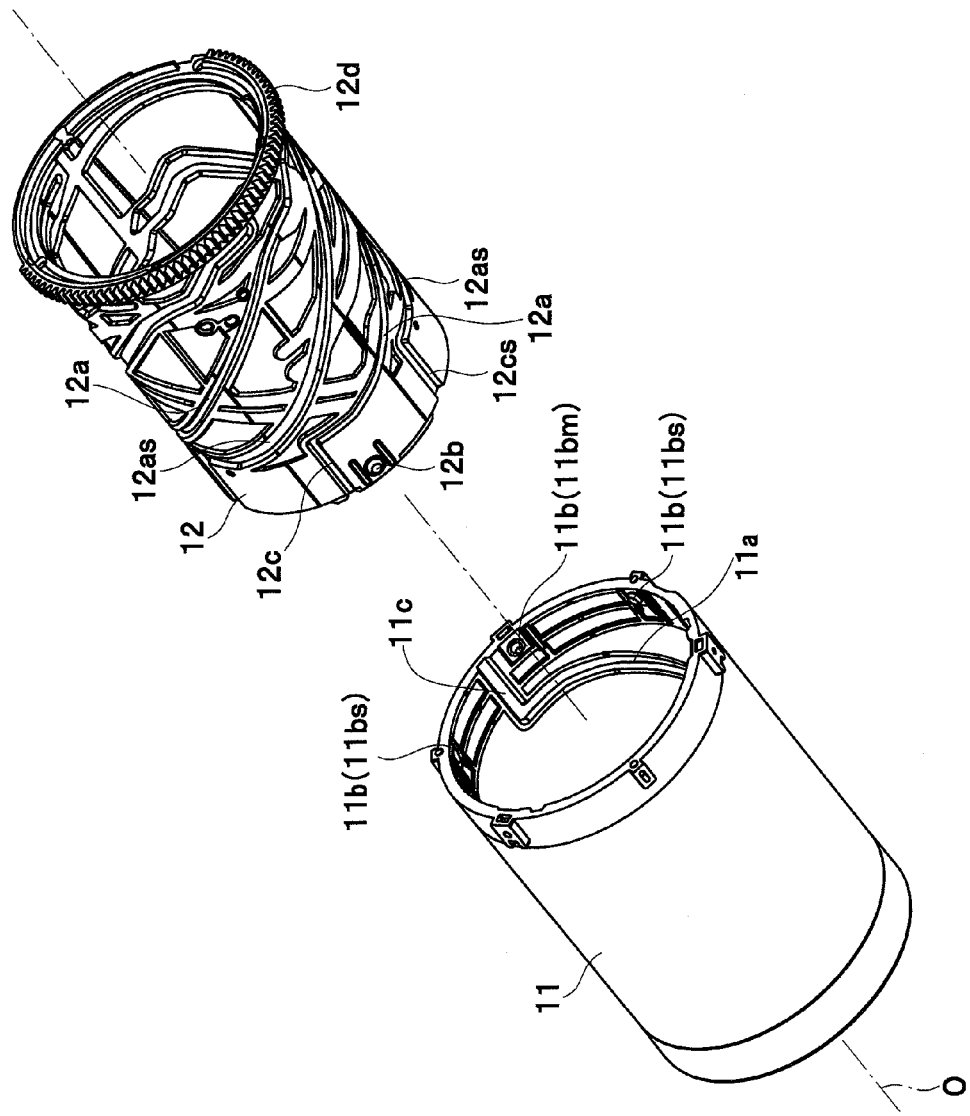
FIG. 5 is a perspective view showing the pair of barrel members shown in FIG. 1 in an exploded manner, viewed at such an angle that in particular the internal surface of the movable barrel can be seen.
Figure 6:
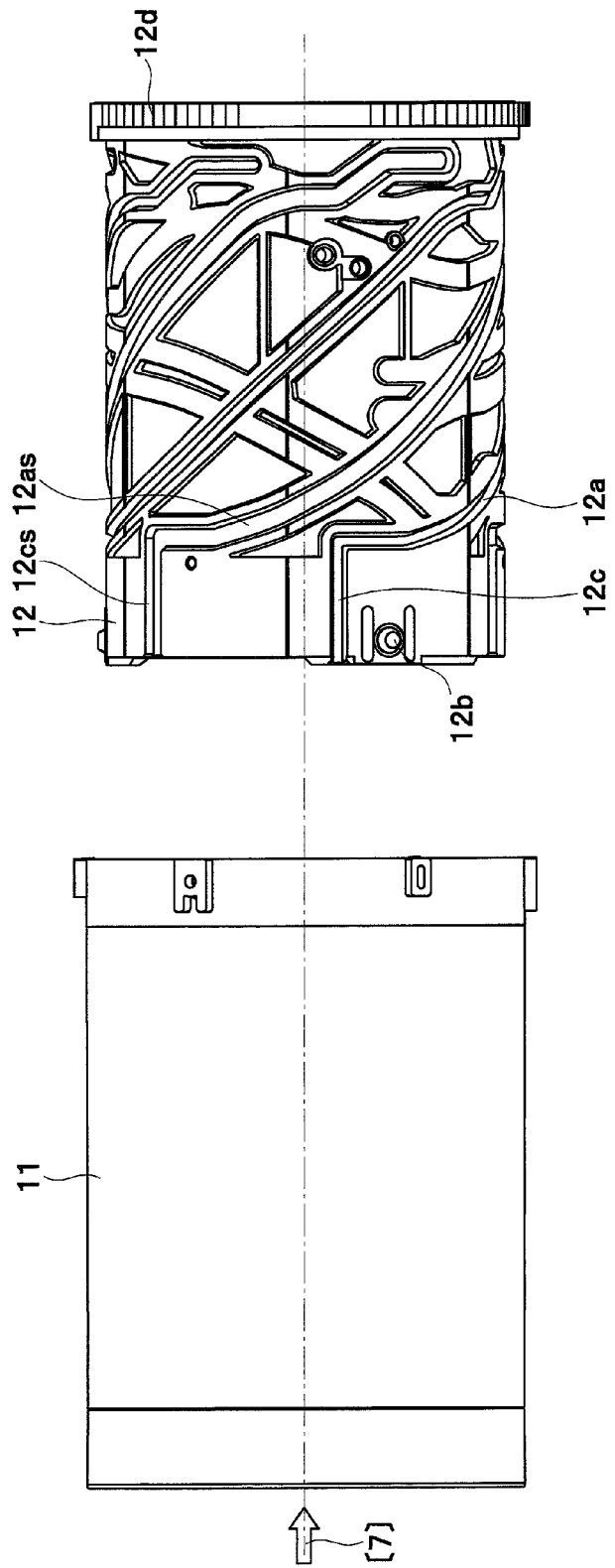
FIG. 6 is a side view showing the pair of barrel members shown in FIG. 1 in an exploded manner.
Figure 7:
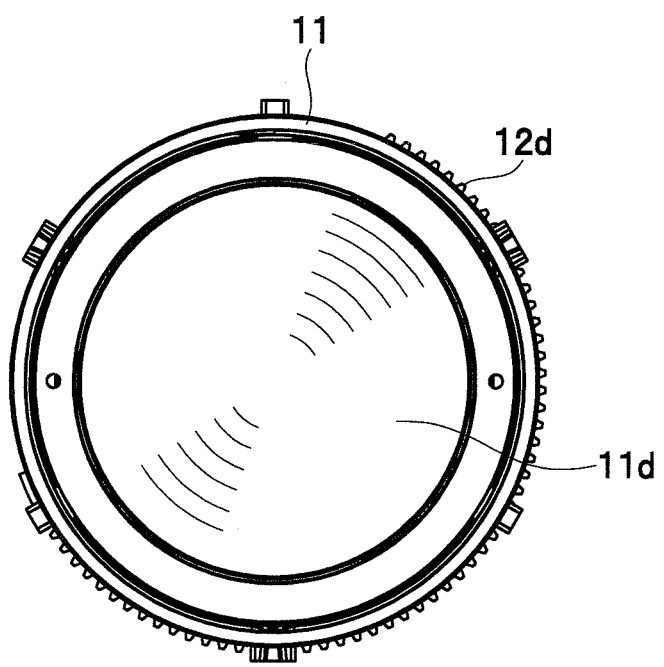
FIG. 7 is a front view of the pair of barrel members in FIG. 1 in an engaging state viewed in a direction of arrow [7] of FIG. 6.
Figure 8:
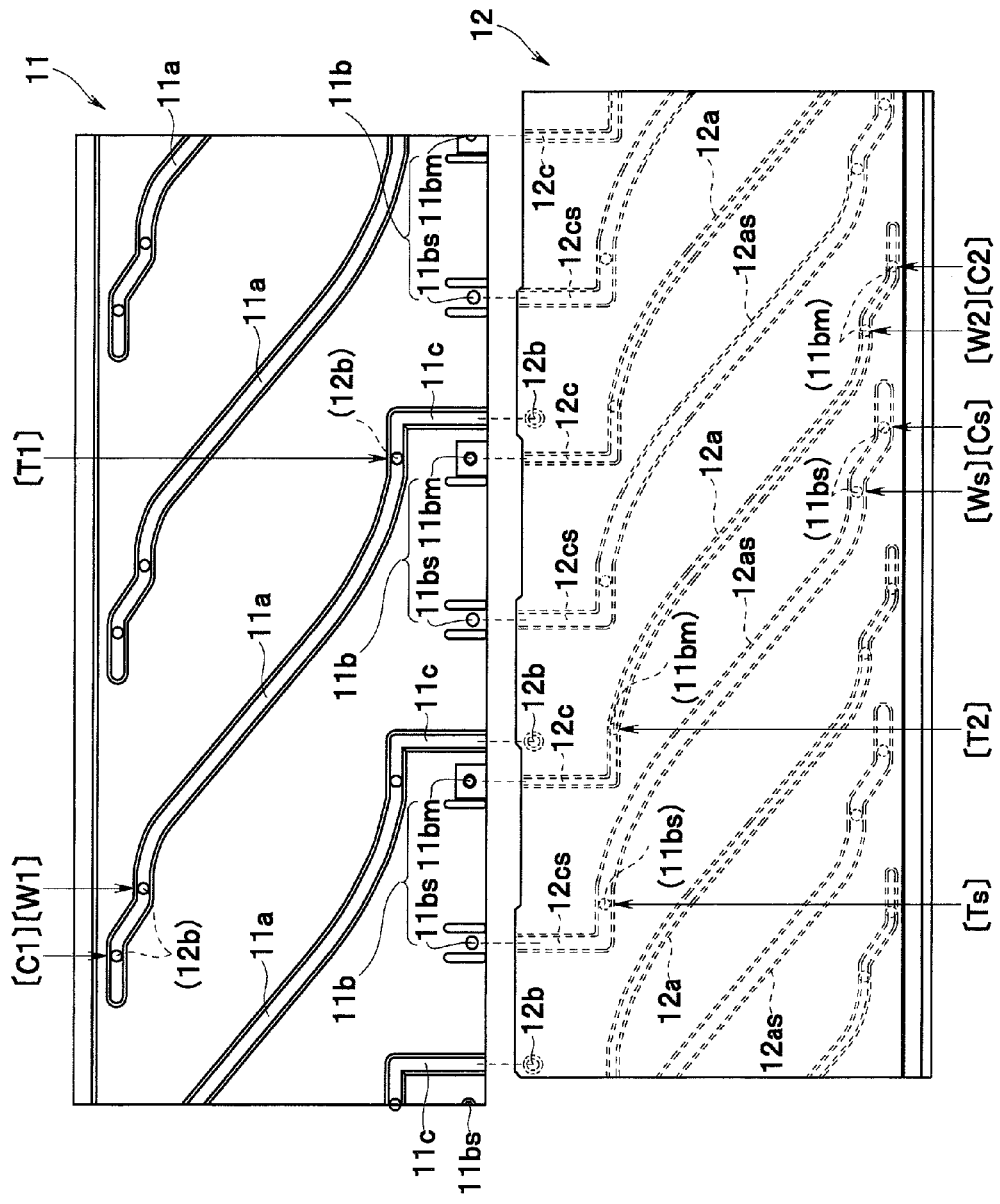
FIG. 8 is a development diagram of the pair of barrel members (the movable barrel and the cam barrel) shown in FIG. 1.

FIG. 1, FIG. 2, and FIG. 4 to FIG. 7 are diagrams showing a pair of barrel members in a lens barrel of the one embodiment of the present invention. FIG. 1 out of these diagrams is a side view showing a retracted state where the pair of barrel members are retracted. FIG. 2 is a side view showing an extended state where the pair of barrel members are extended. In addition, FIG. 4, FIG. 5, and FIG. 6 are diagrams showing the above pair of barrel members in an exploded manner. FIG. 4 out of these diagrams is a perspective view mainly showing the external surface of a cam barrel. FIG. 5 is a perspective view showing a movable barrel viewed at such an angle that in particular the internal surface thereof can be seen. FIG. 6 is a side view. FIG. 7 is a front view of the above pair of barrel members in an engaging state viewed in a direction of arrow [7] of FIG. 6. Note that FIG. 3 is a schematic diagram showing the essential part of the present invention, which is a diagram simply showing a cross section in a state where the above pair of barrel members engage. In addition, FIG. 8 is a development diagram of the pair of barrel members (the movable barrel and cam barrel) shown in FIG. 1. Note that, in FIG. 8, the development diagram for the movable barrel shows the inner circumferential face thereof. In addition, also in FIG. 8, the development diagram for the cam barrel shows the outer circumferential face thereof.

A lens barrel of the present embodiment is used in a photographing device such as a camera (not shown and hereafter simply referred to as a camera), being a zoom lens barrel including a plurality of optical lenses and the like for forming an optical image and configured to enable zooming This lens barrel is configured by a photographing optical system formed by a plurality of optical lenses, a plurality of lens holding barrel members that hold the plurality of optical lenses, respectively, and various drive mechanisms and the like that cause the plurality of lens holding barrel members to move in a direction of the optical axis of the above photographing optical system.

The description of the present embodiment will be made below in detail with respect to constituting members directly relating to the present invention among the plurality of constituting members of the lens barrel to which the present invention applies, that is, the configurations of the pair of barrel members (more specifically, a movable barrel 11 and a cam barrel 12) among the above plurality of barrel members. Note that the whole configuration of the lens barrel itself is substantially similar to the configurations of conventional lens barrels, and the illustrations and detailed descriptions of constituting members other than the above pair of barrel members will be omitted.

First, the general configuration of the pair of barrel members in the lens barrel of the present embodiment will be described below mainly with reference to FIG. 3. As shown in FIG. 3, the above pair of barrel members in the lens barrel of the present embodiment are configured to be brought into cam coupling so as to relatively rotate as well as relatively move in an axis direction (direction along an optical axis O).

That is, a first barrel member, which is one of the above pair of barrel members, is one barrel member that is formed into a cylindrical shape or a ring shape as a whole, and that has a plurality of first cam grooves 11a and a plurality of first cam followers 11b in an inner circumferential face. In the present embodiment, the first barrel member is assumed to be the movable barrel 11 as a lens holding barrel that holds an optical lens 11d being a part of the photographing optical system at a portion close to a front end, and that is configured to advance and retract in the direction along the optical axis O.

In addition, a second barrel member, which is the other one of the above pair of barrel members, is the other barrel member with respect to the above one barrel member that is formed into a cylindrical shape or a ring shape as a whole, and that has a plurality of second cam followers 12b to engage with the above plurality of first cam grooves 11a, respectively, and a plurality of second cam grooves 12a to engage with the above plurality of first cam followers 11b, respectively, in an outer circumferential face. In the present embodiment, the above second barrel member is assumed to be the cam barrel 12 as a zoom drive barrel including a sector gear 12d that receives a driving force from a zoom drive unit, which is not shown, at a rear end outer circumferential edge portion.

The movable barrel 11 (first barrel member) and the cam barrel 12 (second barrel member) configuring the above pair of barrel members are brought into cam coupling as described above. The driving force from the zoom drive unit (not shown) is transmitted to cam barrel 12 via the above sector gear 12d. When receiving this driving force, the cam barrel 12 rotates relatively to the above movable barrel 11 about the optical axis This causes the above movable barrel 11 to relatively move in the axis direction of the rotation of the cam barrel 12 (the direction along the optical axis O).

The cam shapes of the cam grooves 11a and the cam grooves 12a are described as follows. That is, one of two sets of the cam grooves 11a and 12a is provided on the outer circumference of the one of the above pair of barrel members, and the other one of the two sets of cam grooves 11a and 12a is provided on the inner circumference of the other barrel member. In addition, when the two sets of cam grooves 11a and 12a are developed on planes, that is, the above two barrel members are developed on the planes, and the planes are viewed in the same direction, the cam paths of the one set of cam grooves are the cam paths of the other set of cam grooves that are horizontally and vertically flipped (refer to FIG. 8).

In a simpler expression, when the cam grooves are viewed in the same direction on the planes on which the cam paths of the one set of cam grooves and the cam paths of the other set of cam grooves are developed, the cam paths of the other set of cam grooves have shapes obtained by rotating the cam paths the one set of cam grooves through 180 degrees about any one point of the developed plane.

In another expression, the lens barrel of the invention of the application includes one barrel member, the other barrel member that performs relative rotation and relative movement in the axis direction of the rotation with respect to the above one barrel member, the first cam grooves that are provided in the above one barrel member and that allows the above other barrel member to perform the above relative rotation and the relative movement in the axis direction of the above rotation, the first cam followers that are provided in the above one barrel member and that allow the above other barrel member to perform the above relative rotation and the relative movement in the axis direction of the above rotation, the second cam grooves that are provided in the above other barrel member and that engage with and slide on the above first cam followers such that the above one barrel member performs the above relative rotation and the relative movement in the axis direction of the above rotation, and the second cam followers that are provided in the above second barrel member and that engage with and slide on the above first cam grooves such that the above one barrel member performs the above relative rotation and the relative movement in the axis direction of the above rotation.

The above pair of barrel members configured in such a manner, that is, the configuration of the movable barrel 11 (first barrel member) and the cam barrel 12 (second barrel member) are described below in detail with reference to the drawings.

As shown in FIG. 1, FIG. 2, FIG. 7, and the like, with respect to the above pair of barrel members in the lens barrel of the present embodiment, the cam barrel 12 being the second barrel member is inserted into the movable barrel 11 being the first barrel member. As described above, the plurality of first cam grooves 11a and the plurality of first cam followers 11b are formed in the inner circumferential face of the movable barrel 11. In addition, the plurality of second cam grooves 12*a* and the plurality of second cam followers 12*b* are formed in the outer circumferential face of the cam barrel 12, which is a surface facing the inner circumferential face of the movable barrel 11 when the cam barrel 12 is inserted into the movable barrel 11.

Now, as shown in FIG. 5 and FIG. 8, in the inner circumferential face of the movable barrel 11, the first cam grooves 11*a* of the movable barrel 11 in the present embodiment, the number of which is three, are disposed substantially at regular intervals in a peripheral direction. Each of the first cam grooves 11*a* is formed by, as shown in FIG. 8 and the like, a groove-shaped portion formed at a predetermined angle to the optical axis O. Each of these first cam grooves 11*a* is formed so as to be connected to a first linear groove 11*c*, which has a first open end on one end face (rear end face) of the movable barrel 11 and stretches in parallel to the optical axis O. With this configuration, when the cam barrel 12 is inserted into the movable barrel 11 to be brought into cam coupling, the second cam followers 12*b* of the cam barrel 12 are caused to engage from the first open ends of the above first linear grooves 11*c*, and the second cam followers 12*b* are led into the first cam grooves 11*a* via the first open ends.

In addition, the first cam followers 11*b* of the movable barrel 11 in the present embodiment are provided, as shown in FIG. 5, FIG. 8, and the like (only some of them are shown in FIG. 5), in such a manner as to be protrude from the inner circumferential face of the movable barrel 11 in an inward radial direction, and are disposed substantially at regular intervals on the same circumference, the number of which is six. In the present embodiment, three of these six first cam followers 11*b* are defined as main cam pins 11*bm* to engage with the above second cam grooves 12*a*, and the other three first cam followers 11*b* are defined as sub cam pins 11*bs* to engage with sub cam grooves 12*as* that are formed into the same forms as the above second cam grooves 12*a*, that is, formed into the same cam lines (cam paths). Now, the main cam pins 11*bm* and the sub cam pins 11*bs* are disposed so as to be arranged alternately in the peripheral direction on the inner circumferential face of the movable barrel 11.

Note that the main cam pins 11*bm* are cam followers that contribute to the cam coupling between the above pair of barrel members, and the sub cam pins 11*bs* serve for reinforcement. Therefore, to configure the present invention, at least the main cam pins 11*bm* may be provided, and the sub cam pins 11*bs* are not necessarily disposed.

In contrast, the second cam grooves 12*a* of the cam barrel 12 in the present embodiment are disposed, as shown in FIG. 4, FIG. 6, FIG. 8, and the like, in the peripheral direction on the outer circumferential face of the cam barrel 12, the number of which is three. Each of the second cam grooves 12*a* is formed by, as shown in FIG. 8 and the like, a groove-shaped portion formed at a predetermined angle to the optical axis O. Each of these second cam grooves 12*a* is formed so as to be connected to a second linear groove 12*c*, which has a second open end on one end face (front end face) of the cam barrel 12 and stretches in parallel to the optical axis O. With this configuration, when the cam barrel 12 is inserted into the movable barrel 11 to be brought into cam coupling, the main cam pins 11*bm* out of the first cam followers 11*b* of the movable barrel 11 are caused to engage from the second open ends of the above second linear grooves 12*c*, and the main cam pins 11*bm* are led into the second cam grooves 12*a* via the second open ends.

In addition, in the present embodiment, the cam barrel 12 has a plurality (three in the present embodiment: the same number as the above second cam grooves 12*a*) of sub cam grooves 12*as* that are formed into substantially the same form as the above second cam grooves 12*a* and that are disposed so as to be arranged alternately with the second cam grooves 12*a* in the peripheral direction. Each of these sub cam grooves 12*as* are disposed in such a manner as to be arranged alternately with the above second open ends in the peripheral direction, and is formed so as to be connected to a linear groove 12*cs*, which has an open end on the one end face (front end face) of the cam barrel 12 and stretches in parallel to the optical axis O, as with the above second open ends. With this configuration, when the cam barrel 12 is inserted into the movable barrel 11 to be brought into cam coupling, the sub cam pins 11*bs* out of the first cam followers 11*b* of the movable barrel 11 are caused to engage from the open ends of the above linear grooves 12*cs*, and the sub cam pins 11*bs* are led into the sub cam grooves 12*as* via the open ends.

Here, the sub cam grooves 12*as* are formed to have a width a little wider than the width of second cam grooves 12*a*. This is a measure taken such that the sub cam pins 11*bs* can move with some margins because the sub cam pins 11*bs* to engage with the sub cam grooves 12*as* are parts provided for the purpose of reinforcement.

Note that the second cam grooves 12*a* with which the main cam pins 11*bm* are to engage are cam followers that contribute the cam coupling between the above pair of barrel members, and the sub cam grooves 12*as* to engage with the sub cam pins 11*bs* serve for reinforcement. Therefore, to configure the present invention, at least the second cam grooves 12*a* may be provided, and the sub cam grooves 12*as* are not necessarily disposed.

In addition, the second cam followers 12*b* of the cam barrel 12 in the present embodiment are provided, as shown in FIG. 4 to FIG. 6, FIG. 8, and the like (only some of them are shown in FIG. 4 to FIG. 6), in such a manner as to protrude from the inner circumferential face of the cam barrel 12 in an outward radial direction, and are disposed substantially at regular intervals on the same circumference, the number of which is three. The second cam followers 12*b* are caused to engage from the first open ends of the above first linear grooves 11*c* to be led into the first cam grooves 11*a*.

When the above movable barrel 11 and the above cam barrel 12 are then brought into a state of being assembled through cam coupling, as shown in FIG. 8, the second cam followers 12*b* of the cam barrel 12 engage with the first cam grooves 11*a* of the movable barrel 11, and the cam followers 12*b* move along the grooves 11*a*. Meanwhile, the main cam pins 11*bm* of the movable barrel 11 engage with the second cam grooves 12*a* of the cam barrel 12, and the main cam pins 11*bm* move along the grooves 12*a*. Furthermore, the sub cam pins 11*bs* are freely fit and engage with the sub cam grooves 12*as* of the cam barrel 12, and the sub cam pins 11*bs* move along the grooves 12*as*.

In this case, when the second cam follower 12*b* is at a position in the first cam groove 11*a* denoted by reference characters [C1] in FIG. 8, the main cam pin 11*bm* is at a position in the second cam groove 12*a* denoted by reference characters [C2] in FIG. 8, and the sub cam pin 11*bs* is at a position in the sub cam groove 12*as* denoted by reference characters [Cs] in FIG. 8, this lens barrel is set to a state of being most retracted and a state of being not in use, a so-called collapsed state.

On the other hand, when the second cam follower 12*b* is at a position in the first cam groove 11*a* denoted by reference characters [W1] in FIG. 8, the main cam pin 11*bm* is at a position in the second cam groove 12*a* denoted by reference characters [W2] in FIG. 8, and the sub cam pin 11*bs* is at a position in the sub cam grooves 12*as* denoted by reference characters [Ws] in FIG. 8, this lens barrel is set to a wide state out of available states, where a focal distance is set shortest When the second cam follower 12b is then at a position in the first cam groove 11a denoted by reference characters [T1] in FIG. 8, the main cam pin 11bm is at a position in the second cam grooves 12a denoted by reference characters [T2] in FIG. 8, and the sub cam pin 11bs is at a position in the sub cam grooves 12as denoted by reference characters [Ts] in FIG. 8, this lens barrel is set to a tele state out of the available states, where the focal distance is set longest (tele end).

At the time of setting to this tele state (tele end state), the main cam pins 11bm of the above first cam followers 11b and the above second cam followers 12b are disposed substantially in a straight line in a direction parallel to the optical axis O, respectively. In addition, at the same time, the above first cam followers 11b (11bm and 11bs), and the above second cam followers 12b are disposed in such a manner as to be arranged at regular intervals one by one in the circumferential direction. It is therefore possible to make a configuration in which an adequate drop impact strength can be readily secured even in the tele state where the lens barrel is extended at the maximum.

As described above, according to the above one embodiment, the configuration is made such that the plurality of cam grooves and the plurality of cam followers are provided in each of the above pair of barrel members, and the above pair of barrel members are mated with each other, and it is thus possible to achieve a higher strength than conventional ones, for example, in a state of setting at any position between the wide state and the tele state in a use state of the lens barrel.

In addition, the configuration is made such that the plurality of cam followers are disposed at regular intervals in the circumferential direction and the optical axis direction at the time of setting to the tele state, where an insufficient drop impact strength is most concerned aroused, and it is thus possible to secure a higher strength.

Note that, in the above-described one embodiment, the movable barrel and the cam barrel have been described by way of example as the pair of barrel members in the zoom lens barrel, but the present invention is not limited to this configuration, and the present invention can be applied to combinations of barrel members having different functions.

The present invention is not limited to the above-described embodiment, and it should be understood that various modifications and applications are possible without departing from the spirit of the invention. Furthermore, the above embodiment includes inventions in various stages and various inventions can be extracted by appropriately combining a plurality of disclosed components. For example, even if some components are deleted from all the components indicated in the above one embodiment, a configuration with the components deleted may be extracted as the invention if such a configuration can solve an object to be solved by the invention and provides the effects of the invention. The present invention is not limited by specific embodiment, except as limited by the accompanying claims.

Industrial Applicability

The present invention is not limited to cameras (photographing devices) such as digital cameras being electronic devices that are specialized in a photographing function, and can be widely applied to electronic devices of the other forms having a camera function (photographing function), for example, various electronic devices with the camera function (photographing function) such as mobile phones, smartphones, recording devices, electronic notebooks, personal computers, tablet computer devices, game devices, portable televisions, timepieces, and navigation devices using GPS (global positioning system).

Furthermore, the present invention can similarly be applied to electronic devices having a function of acquiring images using an image pickup device and displaying the acquired image on a display device, for example, observed image display devices such as telescopes, binoculars, and microscopes.

What is claimed is:

1. A lens barrel comprising:
a first barrel member on which a first cam groove is formed and which is provided with a first cam follower; and
a second barrel member on which a second cam follower to engage with the first cam groove is formed, and which is provided with a second cam groove to engage with the first cam follower, the second barrel member performing relative rotation and relative movement in an axis direction of the rotation with respect to the first barrel member, wherein the first barrel member has a first open end of a groove connected to the first cam groove on one end face of the first barrel member, the second barrel member has a second open end of a groove connected to the second cam groove on one end face of the second barrel member, and the lens barrel is assembled by causing the second cam follower to engage with the first open end and causing the first cam follower to engage with the second open end.

2. The lens barrel according to claim 1, wherein the lens barrel is a zoom lens, and in a tele end state, the first cam follower and the second cam follower are disposed in a straight line parallel to an optical axis.

3. The lens barrel according to claim 2, wherein the first barrel member and the second barrel member each include a plurality of cam followers and a plurality of cam grooves.

4. The lens barrel according to claim 1, wherein the first barrel member and the second barrel member each include a plurality of cam followers and a plurality of cam grooves.

* * * * *